July 21, 1964

P. T. HAHN 3,141,197

MOLDING APPARATUS

Filed May 15, 1961

INVENTOR.
PAUL T. HAHN
BY
Curtis, Morris & Safford

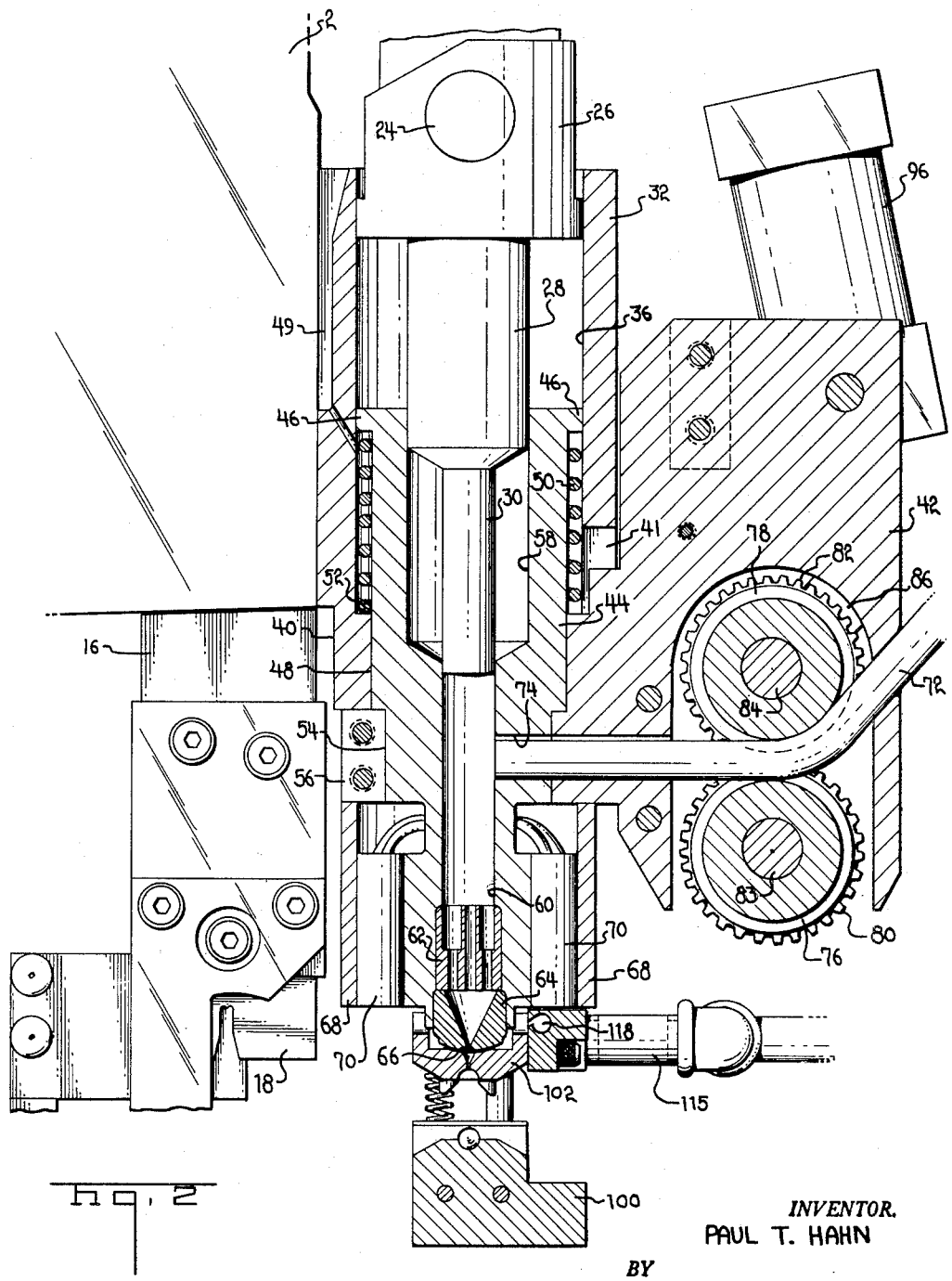

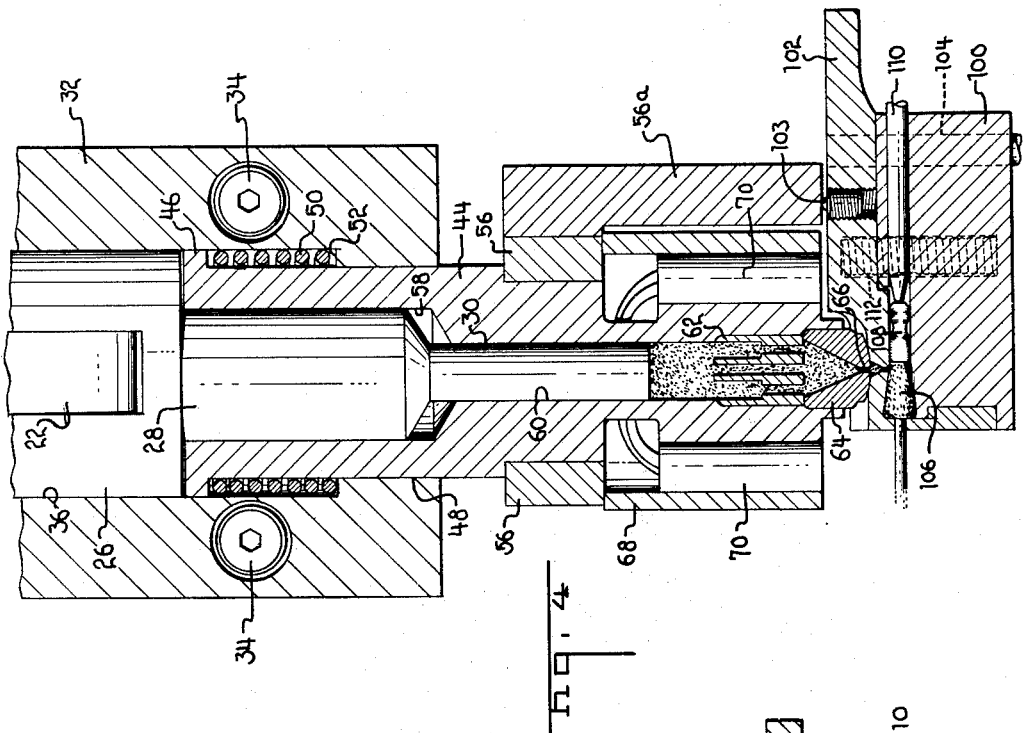
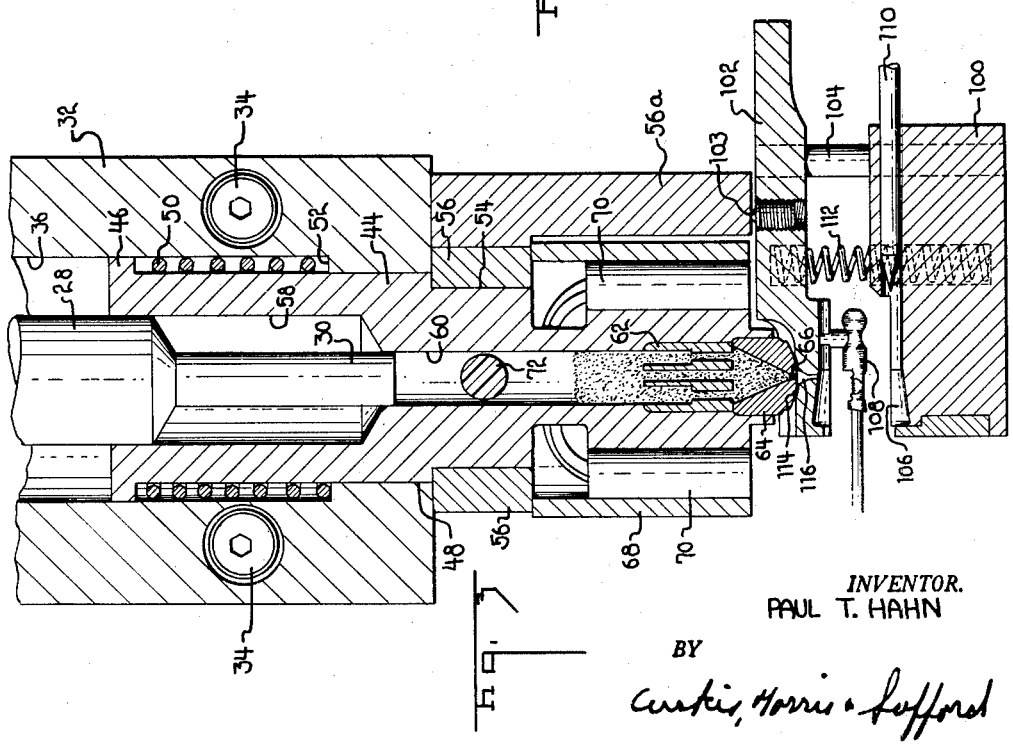

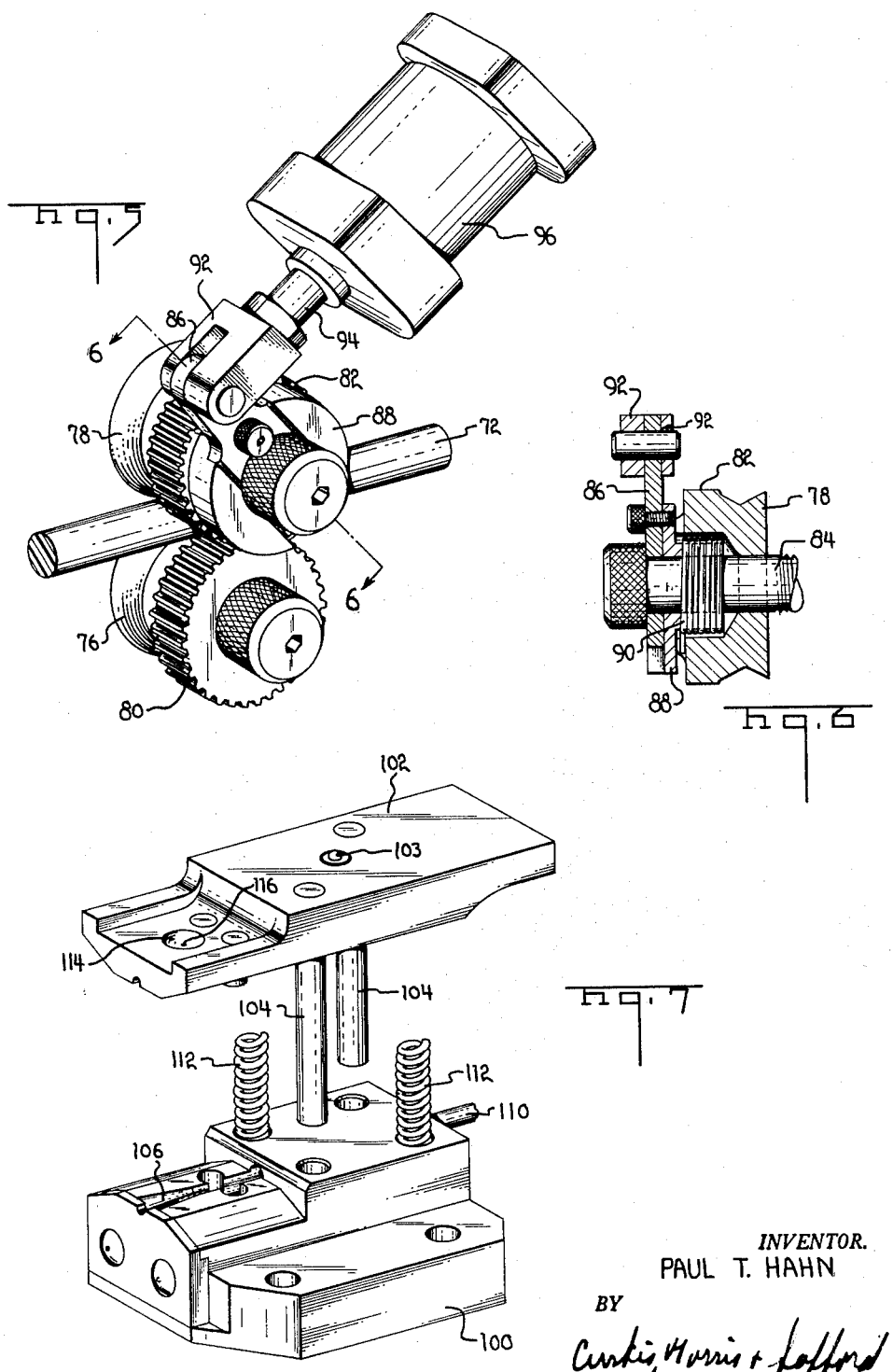

United States Patent Office 3,141,197
Patented July 21, 1964

3,141,197
MOLDING APPARATUS
Paul T. Hahn, Harrisburg, Pa., assignor to
AMP Incorporated, Harrisburg, Pa.
Filed May 15, 1961, Ser. No. 110,254
6 Claims. (Cl. 18—30)

This application is a continuation-in-part of my previous application, Serial No. 772,007, filed November 5, 1958, for Crimping and Injection Molding, and now Patent Number 3,009,197.

This invention relates to improved apparatus for molding plastic materials such as organic plastics amenable to the injection molding process.

An object of the invention is to provide an improved molding apparatus. A further object is to provide an improved device for injection molding which permits the accomplishment of the molding process with only a single reciprocating ram. A still further object is to provide a molding apparatus having automatic feeding and mold-closing means. A still further object is to provide an injection molding device having a split mold in which the mold halves are automatically closed by the action of the injection plunger.

These and other objects of the invention are achieved in a preferred embodiment comprising a reciprocable plunger which is mounted for movement within a cylinder. The cylinder is axially movable and resiliently biased in the direction opposite to the direction which the plunger moves during the injection process. The mold is of two-part construction, one part being movable in the same direction as the plunger to close the mold. A nozzle on the end of the above mentioned cylinder is engageable with this one mold part so that movement of the cylinder results in movement of the one mold part and closure of the mold. In use, molding material is deposited within the cylinder and the plunger moves towards the orifice of the nozzle. The compression of the molding material within the cylinder and the restricted size of the orifice results in a movement of the entire cylinder toward the one part of the mold. As the movement of the plunger proceeds, the molding material is further compressed, the cylinder continues to move and thereby closes the mold. Thereafter, and upon further movement of the injection plunger, the molding material is forced through the orifice and through a passageway in the movable mold part to fill the molding cavity. Advantageously, and in the preferred embodiment, there is provided an automatic feed means for feeding the molding material into the cylinder during each molding cycle. It is also desirable to provide suitable means for heating the molding material during the molding cycle in order to facilitate its passage through the orifice and into the cavity of the mold.

In the drawing:

FIGURE 2 is an enlarged sectional view showing particularly the molding apparatus of the machine of FIGURE 1.

FIGURE 3 is a view taken along the lines 3—3 of FIGURE 1 and showing the positions of the parts at the beginning of an operating cycle of the molding apparatus.

FIGURE 4 is a view similar to FIGURE 3 but showing the positions of the parts near the end of the molding cycle.

FIGURE 5 is a perspective fragmentary view showing the feed means for feeding molding material which forms part of the preferred embodiment.

FIGURE 6 is a view taken along the lines 6—6 of FIGURE 5 and;

FIGURE 7 is a fragmentary perspective view showing the mold of the disclosed embodiment.

Figure 1:
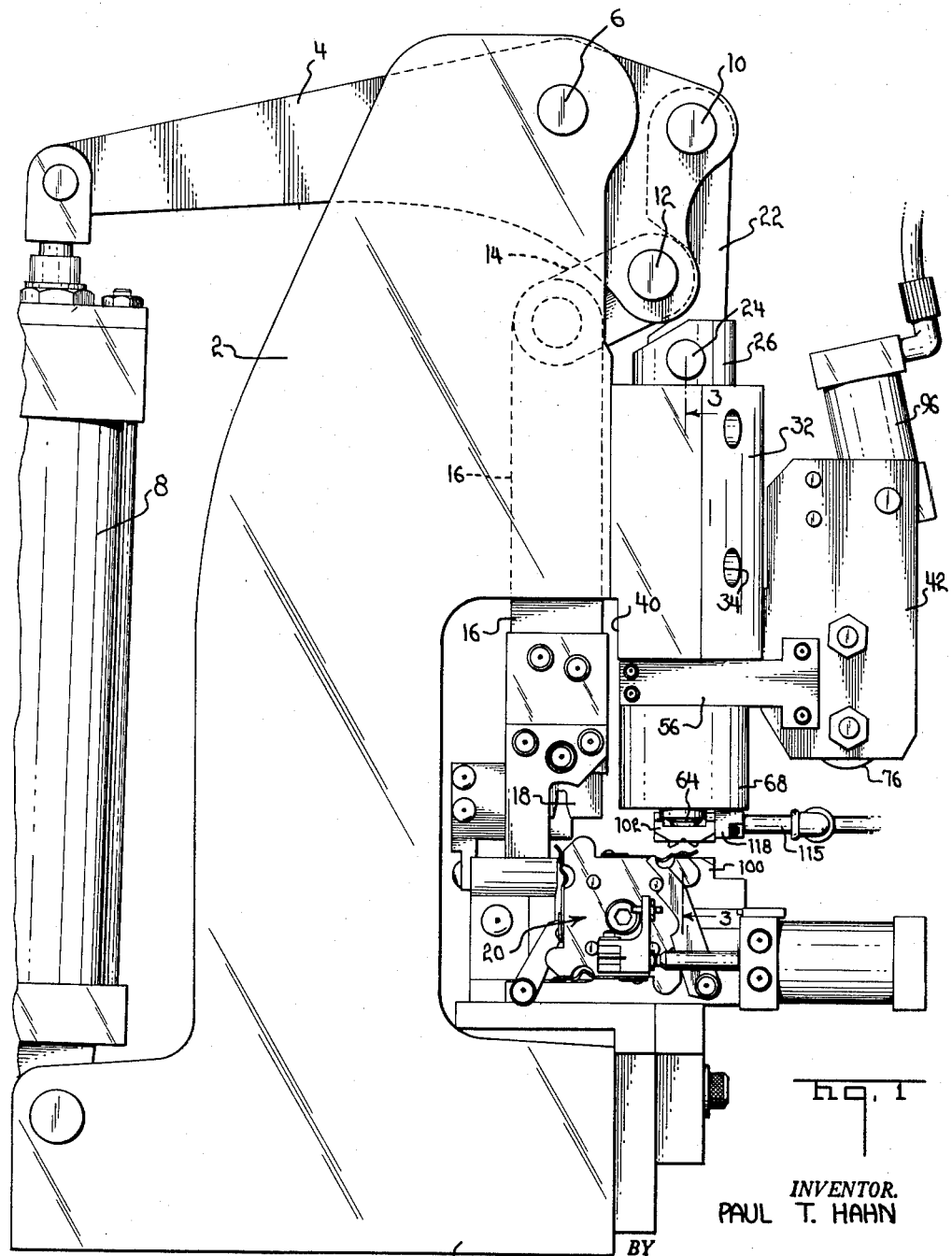
FIGURE 1 is a frontal view of a machine for crimping and molding electrical connectors and incorporating a molding apparatus in accordance with the instant invention.

The disclosed embodiment of the invention constitutes a part of a combined automatic machine for crimping terminals onto the ends of wires, for transferring the thus crimped leads from the crimping station to a molding station, and for molding insulating material around the crimped connection. Since the crimping and transferring devices do not form part of the instant invention, they will be described only to the extent necessary for a clear understanding of the present invention. Reference is made to my previous application, Serial No. 772,007, now Patent No. 3,009,197, for a complete description of the crimping device and reference is further made to the co-pending application of David Ronald Kerns, Serial No. 386, filed January 4, 1960, now Patent No. 3,071,174 for Transfer Device for a complete showing and description of the transfer mechanism shown in the attached drawings.

Referring now to FIGURE 1, the disclosed embodiment comprises a generally C-shaped press frame 2 having a lever 4 pivotally mounted in its upper end at 6 for oscillating motion which is imparted to the lever by means of a pneumatic piston-cylinder 8. The right hand end of the lever as viewed in FIGURE 1 has pivotal connections 10, 12 with links 14, 22. The link 14 is pivotally connected at its opposite end to a ram 16 having crimping means, including the necessary crimping dies 18 secured to its end. As explained in my co-pending application, Serial No. 772,007, now Patent No. 3,009,197, electrical terminals are crimped onto the ends of the wires by means of the crimping dies on the end of this ram and crimping anvils mounted for cooperation with these dies. The leads thus formed are then transferred by means of the transfer mechanism generally indicated at 20 from the crimping station to the molding station at which molding material is molded around the leads in the manner which will now be described. The transfer mechanism generally indicated at 20 is actuated by a cylinder 21 and is fully described in the afore-mentioned Kerns application, Serial No. 386.

Link 22 is received within a slot in the upper portion 26 of a ram generally indicated at 28 and is pivotally connected thereto as shown at 24 in FIGURE 1. Ram 28 has an injection molding plunger 30 on its lower end and is reciprocably received within the enlarged upper end of a housing 32 which is secured to the press frame by means of fasteners 34. The lower portion of the housing 32 is slotted at 41 for the accomodation of a frame or block 42 which is described more fully below.

Slidably mounted within the housing 32 is a cylinder 44 having a circumferential flange 46 on its upper end which bears against the enlarged bore portion 36 of the housing. A spring 50 is interposed between the underside of circumferential flange 46 and a shoulder 52 in housing 32 and normally biases the cylinder to the position of FIGURE 2, a vent 49 advantageously being provided to preclude the possibility of an air lock preventing downward movement of the cylinder. The lower end 48 of the cylinder is slidably received within the reduced diameter portion of the bore of the housing 32 and has a reduced diameter portion 54 for the accomodation of arms 56 which extend from the block 42. It will thus be apparent that this block 42 is secured to the cylinder 44 for movement therewith.

Cylinder 44 is axially hollow, the upper portion 58 of this bore being of substantially the same diameter as the portion 28 of the ram and the lower portion 60 of the bore being adapted to receive the injector 30 on the lower end of the ram. The extreme lower end of the bore 60 is slightly enlarged for the accommodation of a spreader 62 to distribute the molding material evenly during an injection molding process. Beneath this spreader there is provided a nozzle 64 having a relatively small orifice 66 through which the plastic material is forced. Advantageously, a separate housing 68 is mounted in surrounding relationship to the lower end of the cylinder and heating units 70 are mounted in openings in this housing. These heating units are desirable in order to maintain close control over the temperature of the molding material which is injected into the mold as described below.

In operation, it is necessary to charge molding material into the lower portion 60 of the bore of the cylinder 44. In the disclosed embodiment the molding material is provided in the form of a substantially endless filament 72 which is fed through a passageway 74 in the wall of the cylinder and through an aligned passageway in the block 42. Intermittent feeding of this filament of molding material is accomplished by means of a pair of feed wheels 76, 78 which are mounted on shafts 83, 84 in the block 42. Referring now to FIGURE 5, it can be seen that each of the feed wheels 76, 78 has been integral therewith, a gear teeth as shown at 80 and 82. The feed wheel 76 rotates freely on its shaft 83 while the feed wheel 78 is connected to its shaft 84 by means of a oneway clutch 90 mounted on a plate 88. This plate in turn is secured to a lever 86 which is pivotally connected at its end to a clevis 92 on the end of a piston rod 94 of a pneumatic piston-cylinder 96. It will be apparent that the filamentary plastic material is fed when the feed wheel 78 is rotated in a feeding direction and this is accomplished by oscillation of the lever 86 by means of the air cylinder 96. This cylinder is actuated by means of any suitable control switch and inlet valve energized by the press ram at the end of the cycle as explained below. By virtue of the one-way clutch 90, the feed wheel 78 is rotated only in the feeding direction for the filamentary material but is not rotated when the piston rod 94 returns.

Referring now to FIGURE 7, the mold for the preferred embodiment comprises a lower mold half 100 secured to the press frame and an upper movable mold part 102. The two mold parts are maintained in aligned relationship with each other and during movement towards and away from each other by means of a pair of pins 104 extending from the upper mold part 102 into openings in the lower mold part. Springs 112 normally bias this upper half to the position shown in FIGURES 2 and 3 but permit downward movement as the mold is closed.

The cavity 106 which is formed when the two mold halves move against each other is, in the instant embodiment, particularly intended to mold insulating material around portions of an electrical connector 108 on the end of a wire. It will be apparent that the instant invention can be used to mold parts having any desired shape and that the principles of the invention are not limited to the molding of insulating material around an electrical connector. The disclosed embodiment has a pin 110 which is movable into the mold cavity as shown in FIGURES 3 and 4 to close up the axial opening in the connector 108 as illustrated in FIGURE 4. It will again be appreciated that this pin is merely required because of the exact nature of the electrical connector and that this core pin will not be required for many types of moldings. Advantageously, this pin is concatenated with the press ram for movement into the mold cavity when the mold parts are closed or it can be moved by means of a separate piston cylinder (not shown).

The upper surface of the upper mold half 102 has a portion 114 which conforms to the external surface of the nozzle 64. A passageway 116 extends inwardly from the center of this surface and communicates with the mold cavity when the mold parts are together to permit the injection of the molding material into the molding cavity.

Under some circumstances, it will be found that it is desirable to cool the mold between each molding cycle, particularly, if the machine is run at a relatively high rate. In the disclosed embodiment, such cooling is accomplished by means of compressed air conveyed to the vicinity of the mold by means of an air line 115 and a manifold 118 which surrounds the passageway or sprue opening 116. In order to promote rapid cooling of the mold, it is desirable to separate the nozzle and the mold between injection cycles. This is done by means of an extension 56a on one of the arms 56. The extension engages a detent 103 in the upper mold part 102 so that the surface 114 is separated from the nozzle when the mold is open.

In use, the parts will be in the positions of FIGURES 2 and 3 at the beginning of the cycle. At the beginning of the cycle, the feed wheels 76, 78 are first actuated to feed filamentary material into the bore 60. Thereafter, the lever 4 is rocked in a clockwise direction, as viewed in FIGURE 1, the ram 28 moves downwardly and the previously fed molding material 72 which projects into the cavity 60 is sheared from the end of the filament and compressed in the lower portion of the bore 60 of the cylinder 44. Compression of this material results in a downward thrust being exerted upon the cylinder 44 by virtue of the extremely small size of the orifice 66 in the nozzle. As a result, the cylinder moves downwardly and compresses spring 50 until the external surface 114 of the nozzle contacts the surface portion 116 of the upper mold half. Continued downward movement of the plunger results in the upper mold half itself being moved downwardly with concomitant compression of the springs 112 until the two mold halves are together and the terminal 108 is gripped within the cavity of the mold. Thereafter, and upon further downward movement of the plunger 30, the molding material is forced through the orifice 66, through the passageway 116 until the mold cavity has been filled.

In the embodiment of the invention shown, it is intended that there will always be some residual molding material in the bore portion 60 at the end of each cycle as is apparent from FIGURE 3. The amount of material which so remains will vary depending upon the size of the molding but it is obvious that during each cycle, the amount of filamentary molding material fed should be substantially equal to the amount of molding material required to make the molding. Feeding of the molding material can take place at the end of the cycle, if desired, rather than at the beginning of the cycle.

A salient advantage of the invention is that only a single reciprocating plunger is required to both close the mold and inject the molding material. This results in substantial economy of the operation, of maintenance, and of construction in that the molding apparatus is substantially simplified as compared to the more conventional type of molding machine which requires a separate cylinder or other means for closing the mold halves.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. Injection molding apparatus comprising, a plunger, a cylinder in surrounding relationship to said plunger, a normally open two-part mold, one part of said mold being disposed adjacent to said cylinder and being adapted to move towards the other part thereof to close said mold, resilient means biasing said cylinder relative to said plunger away from said mold, a nozzle on the end of said cylinder which is adjacent to said mold and a passageway in said mold in alignment with said nozzle whereby, upon movement of said plunger towards said mold, molding material in said cylinder is compressed and said cylinder is thereby moved against the force of said resilient means towards said mold, and said mold is thereafter closed, and upon further movement of said plunger towards said mold and relative to said cylinder, molding material is injected into the cavity of said mold.

2. Apparatus as set forth in claim 1 including resilient means normally biasing said mold parts apart.

3. Apparatus as set forth in claim 1 including a stationary housing in surrounding relationship to said cylinder, and wherein said resilient means comprises a spring effective between opposed shoulders on said cylinder and said housing.

4. Injection molding apparatus comprising, a plunger, a cylinder in surrounding relationship to said plunger, said cylinder and said plunger being axially movable relative to each other, a mold comprising a fixed part and a movable part, said movable part being movable towards and away from said fixed part along a path extending parallel to the common axis of said plunger and said cylinder, a first resilient means biasing said cylinder with respect to said plunger away from said mold, a second resilient means effective between said mold parts and biasing said movable part towards said cylinder and said plunger, and a nozzle on said cylinder at the end thereof which is adjacent to said movable mold part whereby, upon movement of said plunger relative to said cylinder towards said mold, molding material in said cylinder is compressed and said cylinder is moved towards said mold and said nozzle moves against said movable mold part, and upon further movement of said plunger towards said mold, said cylinder, said plunger, and said movable mold part move as a unit towards said fixed mold part to close said mold, and upon still further movement of said plunger, molding material in said cylinder is forced through said nozzle and into said mold.

5. Apparatus as set forth in claim 4 including means for charging molding material into said cylinder.

6. Apparatus as set forth in claim 4 including intermittently operated feed wheels for feeding molding material in filamentary form into said cylinder.

References Cited in the file of this patent

UNITED STATES PATENTS

| | | |
|---|---|---|
| 2,102,328 | Morin et al. | Dec. 14, 1937 |
| 2,558,027 | Wilson | June 26, 1951 |
| 2,812,548 | Quinche et al. | Nov. 12, 1957 |
| 2,834,050 | Dymsza et al. | May 13, 1958 |
| 2,964,791 | McFarland | Dec. 20, 1960 |

FOREIGN PATENTS

| | | |
|---|---|---|
| 751,716 | Great Britain | July 4, 1956 |
| 945,281 | France | Nov. 22, 1948 |
| 984,341 | France | Feb. 21, 1951 |
| 1,097,707 | France | July 8, 1955 |